Sept. 22, 1925.
L. M. WEBBER
CALCULATING DEVICE
Filed Jan. 14, 1925
1,554,931
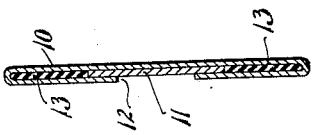

Patented Sept. 22, 1925.

1,554,931

UNITED STATES PATENT OFFICE.

LEONARD M. WEBBER, OF BERWYN, ILLINOIS.

CALCULATING DEVICE.

Application filed January 14, 1925. Serial No. 2,405.

*To all whom it may concern:*

Be it known that I, LEONARD M. WEBBER, a citizen of the United States, residing at Berwyn, in the county of Cook and State of Illinois, have invented new and useful Improvements in Calculating Devices, of which the following is a specification.

This invention relates to improvements in calculating devices and has for an object the provision of means whereby a date either forward or backward from a given date may be easily calculated, together with the number of days intervening between two dates.

In other words, the invention provides means whereby the date upon which a given period will expire, the date upon which a given period began, or the number of days, weeks or months intervening between two given dates, may be readily determined.

With the above and other objects in view, the invention further includes the following novel features and details of construction, to be hereinafter more fully described, illustrated in the accompanying drawings and pointed out in the appended claims.

In the drawings:—

Figure 1 is an elevation of the invention showing the slide partly extended.

Figure 2 is a similar view with the slide removed.

Figure 3 is an enlarged transverse sectional view.

Referring to the drawings in detail wherein like characters of reference denote corresponding parts, the invention as shown comprises a pair of relatively movable members 10 and 11, the former being provided with a slot 12 throughout its length. The member 10 may be made of any suitable material, but it is preferred to make the said member of some light durable material such as celluloid, the edges of the material being bent over upon filler strips 13. These strips have their opposed inner edges spaced from the opposed edges of the material so that a substantially T-shaped slot is formed which provides a guide for the member 11 and in which said member is slidable. The members 10 and 11 are substantially coextensive in length and the member 10 is provided at opposite ends with notches 14 to provide finger notches whereby the ends of the member 11 may be readily grasped.

Arranged upon opposite sides of the slot 11 are rows of longitudinally and transversely spaced figures 15 representing one day in each week of a calendar year (preferably the last day of the week). One longitudinal row of figures is provided for a single year, the particular year being indicated at 16. The figures are further divided into months, the latter being indicated at 17.

Located within the slot 12 are two rows of figures indicated at 18. These rows each represent the 52 weeks in a calendar year, the figures of each row being reversely arranged.

The member 11 or slide contains a row of figures 20 representing the 52 weeks in a calendar year, while in addition this row contains a cipher or zero mark.

In the use of the invention, if it is desired to ascertain upon what date 20 weeks from March 8, 1924 will fall, the zero mark or cipher is moved into register with March 8, 1924. Reading upon the row 20 of figures upon the slide 11 it wil be seen that the number 20 registers with July 26, 1924, this being the date at which 20 weeks from March 8 would expire.

Should the calculation extend into 1925, the date would be read upon the row of figures indicated by the year 1925. In other words if it is desired to determine upon what date 40 weeks from August 2, 1924 will expire, the slide 11 is moved so that the zero mark will register with August 2, 1924. In this position number 21 on the slide will appear at the end of the year or beneath the last week in December. 21 is then deducted from 40, the remainder being 19. The number 19 on the upper column of figures 18 is now located and the number within the year 1925 which registers with 19 will be found to be May 9, so that the 40 weeks will expire May 9, 1925.

Conversely, if it is desired to determine at what date a given period began, for example 30 weeks from September 20, 1924, number 30 on the slide is positioned so as to register with September 20, 1924. The date registering with the zero mark on the slide will be found to be February 23, 1924, the date at which the period of 30 weeks began.

To calculate a date extending back to a preceding year, such as the year 1923, the method is much the same as the second example given. For example to find the date at which 37 weeks from April 11, 1925, began, bring 37 on the slide in register with April 11, 1925, and it will be found that the number on the slide which registers with the first week of the year is 23. Now locate 23 in the lower row of figures 18 and it will be found that 23 registers with July 26, 1924, which is the date of the beginning of the 37 weeks.

If it is desired to determine the number or approximate number of weeks intervening between two given dates, such as the number of weeks intervening between July 12, 1924, and December 20, 1924, the slide 11 is moved to bring the zero sign into register with July 12 and as the number 23 on the slide registers with December 20, 23 will be the number of intervening weeks.

The invention is susceptible of various changes in its form, proportions and minor details of construction and the right is herein reserved to make such changes as properly fall within the scope of the appended claims.

Having described the invention what is claimed is:—

1. A calculating device comprising a longitudinally slotted member, indicia upon the face of said member upon opposite sides of the slot, said indicia being arranged to indicate a plurality of calendar years divided into months and weeks, indicia within the slot corresponding to the fifty-two weeks of a calendar year and cooperating and registering with the first mentioned divisions, a slide movable longitudinally of the slot and indicia upon the slide representing the fifty-two weeks of a calendar year and arranged to be brought into register with the first mentioned weekly divisions.

2. A calculating device comprising an elongated rectangular slotted member, numerals representing daily, weekly and monthly divisions of one or more calendar years provided upon opposite sides of the slot, numerals representing 366 days or 52 weeks of a calendar year within the slot, the numerals within the slot being arranged in separate rows in reverse order and registering with the numerals upon opposite sides of the slot, a slide movable within the slot, the numerals upon the slide being adapted for register with the first mentioned numerals, whereby the slide may be operated to determine the date upon which a given period of time began or will end, or the number of days intervening may be calculated.

3. A calculating device comprising a pair of relatively movable members, one of said members having spaced parallel year scales divided into weeks and months and the other member having a scale located between the spaced year scales and representing the fifty-two weeks of a year and adapted to register with the divisions of the first mentioned year scales.

In testimony whereof I affix my signature.

LEONARD M. WEBBER.